Feb. 10, 1970     O. W. THORSMAN     3,494,580
CABLE CLAMP
Filed Sept. 13, 1967     2 Sheets-Sheet 1
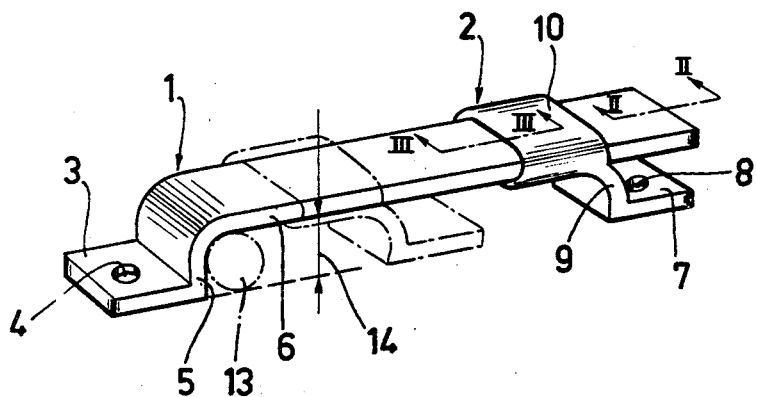
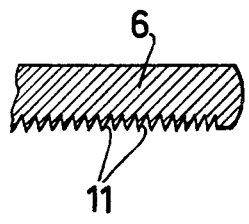
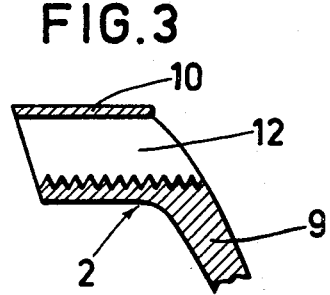

Feb. 10, 1970     O. W. THORSMAN     3,494,580
CABLE CLAMP

Filed Sept. 13, 1967     2 Sheets-Sheet 2

United States Patent Office 3,494,580
Patented Feb. 10, 1970

3,494,580
CABLE CLAMP
Oswald Willy Thorsman, Nykoping, Sweden
Filed Sept. 13, 1967, Ser. No. 667,535
Int. Cl. F16l *3/22*
U.S. Cl. 248—68                             3 Claims

ABSTRACT OF THE DISCLOSURE

A cable clamp for mounting a varying number of cables, ducts or similar objects on a wall or the like comprising a cable strap member including a mounting piece and an elongated clamp strap element extending from the mounting piece and an adjustable limiting or stop piece. The clamp strap element is substantially rigid and stands off from the mounting piece a distance corresponding to the diameter of the cables to be clamped, or the transverse dimension of any other objects to be clamped, and the limiting or stop piece is provided with a sleeve portion for receiving the strap element and providing a corresponding stand-off.

---

This invention relates to a cable clamp adapted for mounting a varying number of cables, ducts and the like on a wall or the like, which clamp comprises a mounting piece disposed at one end of a clamp strap and an adjustable limiting piece holding the clamp strap.

A cable clamp of the aforesaid kind is previously known to consist of a strap provided with a mounting plate. Subsequent to the fastening of this mounting plate on a wall or the like the strap is to be bent around one or several cables, whereafter by means of a second loose mounting plate to be arranged on the other side of the cables the mounting is effected. The strap is provided with a longitudinal slot through which the mounting screw of the second mounting plate is to be inserted. The strap as well as the second mounting plate are on their surfaces facing each other provided with grooves or the like which upon mounting engage with each other.

This known construction involves several disadvantages. The slot and the grooves, for example, give the impression of a disordered arrangement which, besides, shows the tendency of collecting dust. A considerable disadvantage is further to be seen in the fact that the clamp must be delivered in two separate parts. The known clamp, moreover, is made of a soft material in order to be bendable around the cables. The known clamp requires the application of a clamping tool, and for its mounting on a ceiling two men are needed.

The present invention has as its object to produce a cable clamp which does not include the aforesaid disadvantages and which renders easy mounting possible.

This object is achieved by the invention, in that the clamp strap is formed as a rigid tongue, and an intermediate piece corresponding to the cables to be clamped and arranged between the mounting plate and the tongue is given a height corresponding to a definite cable size, and that the limiting piece comprises a mounting plate, a through sleeve for receiving the tongue and an intermediate piece corresponding to the form of the intermediate piece of the tongue for connecting the plate with the sleeve.

The technical progress is the easiness with which the cables can be mounted. This easiness is due to the fact that the cables to be mounted are held by the clamp on the wall or the like already prior to the final fastening of the clamp. The mechanic, thus, need not hold the cables during the mounting operation, but has both of his hands free for fastening the clamps, which is particularly advantageous when cables are to be mounted on ceilings from below in an uncomfortable position.

As a further advantage can be mentioned that even for laying a different number of cables side-by-side by using a single clamp, the heretofore necessary complicated bending of the clamp strap is not longer required.

In a further development of the inventive idea it can be expedient to construct the two main parts of the cable clamp, i.e. the clamp strap and the limiting piece, in such a manner, that subsequent to their fitting into one another they form a bow with adjustable span width and substantially constant height.

This construction offers the advantage over the known two-piece clamps that the clamp is immediately ready for mounting and that it ensures fool-proof safety against mislaying or even losing the one or the other of the clamp parts.

The application of a rigid tongue instead of the known flexible strap involves for the cable clamp according to the invention particularly the advantage, that the cable clamp can be utilized during the mounting operation for holding the cables, without the risk that, as in the case of the known cable clamps with a flexible strap, the clamp by the mere weight of the cables is bent back to such an extent that its use for holding and supporting the cables is out of question.

The drawings show by way of example embodiments of the invention.

FIG. 1 shows a perspective view of a cable clamp comprising two main parts,

FIG. 2 shows a partial longitudinal section through the outermost portion of the tongue along the line II—II in FIG. 1, the toothing of the tongue being exaggerated for showing the inclination of the teeth more clearly, FIG. 3 shows the limiting piece in a section along the line III—III of FIG. 1.

Figure 4:
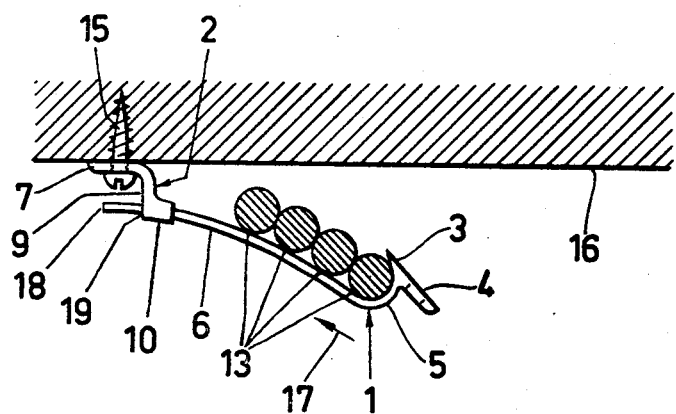
FIG. 4 shows the mounting procedure of a cable clamp to be fastened on a ceiling.

The cable clamp shown in FIG. 1 comprises the clamp strap 1 and the limiting piece 2 which are made of a semi-rigid or rigid material and together form a bow of adjustable span width and substantially constant height 14. The clamp strap 1 comprises a mounting plate 3 with a screw hole 4, an intermediate piece 5 extending at a substantially right angle from the plate 3, and a tongue 6 extending from the intermediate piece 5 substantially in parallel with the mounting plate 3.

In a similar way the mounting piece 2 comprises a mounting plate 7 with a screw hole 8, an intermediate piece 9 extending at a substantially right angle from the plate 7, and a sleeve 10 extending from the intermediate piece 9 substantially in parallel with the mounting plate 7. The internal dimension of the sleeve 10 agrees substantially with the external dimension of the tongue 6, so that the sleeve is displaceable on the tongue.

The clamp strap 1 and the mounting piece 2 can be so arranged that they are held together merely by force fit. Preferably, however, the tongue 6 on its outer surface and the sleeve 10 on its inside surface are provided with grooves or teeth 11 on one or more of their four longitudinal sides (see FIGS. 2 and 3). The tooth profiles are designed as saw teeth with opposite direction, which renders it easier to push the two parts 1 and 2 into one another, but renders it more difficult to separate them by pulling. This constitutes a considerable advantage from the mounting point of view.

Both the clamp strap 1 and the limiting piece 2 are rounded off at the transition between the intermediate pieces 5 and 9 respectively and the upper portion as the tongue 6 and sleeve 10 respectively. As appears from FIG. 3, the recess 12 of the sleeve 10 opens accurately at this roundness 9 of part 2.

The cable clamp is preferably delivered with its two main parts 1, 2 in assembled state, the tongue 6 thereby projecting slightly out of the sleeve 10. For the mounting on a vertical wall first the limiting piece 2 for a greater number of clamps is fastened whereafter the cable laying proper can be commenced. For inserting the cables, the limiting piece together with the entire clamp strap 1 is bent outwards whereby the full weight of the cables is made to rest on the intermediate piece 9 of the limiting piece. Thereafter the tongue 6 is pushed into the sleeve 10, and the mounting plate 3 of the clamp strap 1 is secured by screwing on the wall. Finally, if desired, the projecting portion of the tongue 6 is removed, preferably by pinching it off. If, however, the laying of more cables can be expected in a foreseeable time, the projecting portion may remain, because it facilitates the laying of supplementary cables.

The mounting on a ceiling is carried out in a similar way: The limiting piece 2 is fastened with its mounting plate 7 by a screw 15 inserted from below onto the ceiling 16. Previously the mechanic has pulled the tongue 6 out of the sleeve 10 to such a distance that the end 18 of the tongue aligns with the outer end surface 19 of the intermediate piece 9. Then a number of cables 13 are placed on the tongue 6, whereby the tongue is caused to slightly curve downwards. Due to the fact that one of the cables rests against the intermediate piece 5 of the clamp strap 1, the cables are prevented from sliding off. The mechanic now moves the tongue 6 in the direction of the arrow 17 until the uppermost cable 13 abuts to the intermediate piece 9 of the limiting piece 2. Finally, the mounting plate 3 is secured by screwing from below on the ceiling 16 by means of a second screw (not shown).

What I claim is:

1. A cable clamp for mounting a varying number of cables, ducts, or the like on a wall or the like, comprising a clamp strap and a limiting piece, the clamp strap having a mounting portion adapted to be fastened to the wall and an elongated tongue extending from the mounting portion so as to be spaced from and generally parallel to the wall when mounted on the wall, and the limiting piece having a mounting base portion adapted to be fastened to the wall and a tongue retainer sleeve portion defining an opening through which the tongue extends and by which the free end of the tongue is retained, the tongue and sleeve portion being formed so as to be in restrained sliding relation whereby the clamp strap is maintained in fixed position on the limiting piece during installation but can be slid into position to engage the cables to complete installation and the clamp strap and limiting piece having smoothly curved portions facing each other concavely when installed, such curved portions matching the shape of cables to be mounted thereby.

2. A cable clamp according to claim 1 wherein the clamp strap and limiting piece are maintained in restrained sliding relation by a force fit between the clamp strap tongue and the limiting piece sleeve opening.

3. A cable clamp according to claim 1 wherein the clamp strap and limiting piece are maintained in restrained sliding relation by interengaging teeth formations on the tongue and in the sleeve opening.

References Cited

UNITED STATES PATENTS

| | | | |
|---|---|---|---|
| 2,969,216 | 1/1961 | Hallsey | 24—73.7 X |
| 2,026,312 | 12/1935 | Houts | 248—68 X |
| 2,366,041 | 12/1944 | Morehouse | 248—68 X |
| 2,451,884 | 10/1948 | Stelzer | 248—251 |
| 2,643,775 | 6/1953 | Franklin | 211—123 X |
| 3,306,641 | 2/1967 | Blum | 248—25 X |

FOREIGN PATENTS 1,029,069   4/1958   Germany.

CHANCELLOR E. HARRIS, Primary Examiner

U.S. Cl. X.R.

24—73